Patented Dec. 11, 1934

1,983,658

UNITED STATES PATENT OFFICE 1,983,658

COLORLESS SYNTHETIC RESIN AND PROCESS OF MAKING SAME

Oscar A. Cherry, Chicago, Ill., assignor to Economy Fuse and Manufacturing Company, Chicago, Illinois, a corporation of New York No Drawing. Application August 14, 1930
Serial No. 475,376

3 Claims. (Cl. 260—8)

This invention relates to a novel colorless synthetic resin and to the process of making same.

It is well known that resins derived from the interaction of citric acid and glycerol or other polyhydric alcohol are characterized by being relatively very tough and strong as compared to other synthetic resins. By carrying out the heat treatment at a relatively low temperature (160° C. or less) products possessing a light yellow color can be obtained.

However, the products so made are lacking in water resistance, having the property of absorbing or taking up moisture from atmospheres carrying a considerable quantity of water vapor. Due to the absorption of water swelling occurs and hydrolysis begins. As a result of the hydrolytic action, glycerine is liberated and the products increase in hygroscopicity. If continued complete hydrolysis occurs.

The hygroscopicity of the material can be materially lessened by continuing the heat treatment of the products after infusibility has been obtained at 180° C. or even 200° C., although the latter temperature if too long continued results in a decrease in strength of the products. By this treatment, however, a considerable deepening of the color occurs, thus rendering the products unsuitable for applications where absence of color as well as lack of hygroscopicity are requisites.

It is therefore an object of this invention to provide a novel product which is free from the above objections and not only lacks hygroscopicity, but is water white to the passage of light.

I have discovered that it is possible by the introduction of a certain dye into the product at a stage previous to the product becoming infusible and insoluble to obtain such a colored product that upon the development of the color due to heat treatment, the two colors neutralize each other and a substantially water-white product is obtained.

Of course it is well known that complementary colors neutralize each other and advantage of this fact is taken in various arts but as far as I am aware such an application of complementary color effects has not heretofore been possible in the synthetic resin art.

The addition of the dye has advantages other than that of the production of a water-white resin. As before stated the later-stage elevated temperature heat treatment results in the production of the yellow or yellow-green color. The depth of color is also dependent on the length of this heat treatment. Therefore after the addition of the dye and before the final heat treatment the resinous mass is of a violet color. As the heat treatment progresses and as the ester product changes to its more water-resistant form, it gradually becomes lighter colored and if the proportion of dye has been correctly adjusted the resinous product becomes colorless at the time when its water-resistance has reached a maximum.

There is thus provided a simple visual method for determining when the heat treatment has been sufficiently prolonged without the necessity of making laborious chemical tests.

Sheets of this material about one millimeter in thickness are substantially water white by light passing through the thickness of the sheet or by light reflected from the surface. However, when the sheet is viewed from the edge a faint violet color can be detected. This is unimportant for most applications. If the heat treatment is continued until the edge appears colorless the surface of the sheet will show of a light yellow color.

I am aware that it has heretofore been proposed to add to a synthetic resin capable of being rendered infusible by heating to a critical temperature a dye adapted to change color when that temperature is reached. This process of course, is entirely different from the one described above.

In the present case by experimentation, a dye was discovered the color imparted by which is the exact complement of the color developed by prolonged heat treatment of the citric-acid glycerol resin. No claims are made to the broad well known principle of neutralization of colors by their complements. This invention is limited to the incorporation of a particular dye into a particular synthetic resinous product and to the product thereby obtained.

The dye I have found suitable for my use is known on the market as methyl violet 2 B. It may be added at any time previous to the conversion of the citric-acid resin to the infusible, substantially insoluble state but I prefer to add the dye at the beginning of the reaction between the acid and alcohol.

As an illustration I may add to 200 grams of citric acid crystals and 100 grams glycerol, 8 cubic centimeters of a $\frac{1}{10}$ of 1% solution of methyl violet 2 B in water. The esterification may then be carried out in any manner known to the art and at a suitable stage of the reaction the resinous product which is violet in color may be cast into sheet or other desired form.

The cast product may then be heated to infusibility. As is well known, the heating must be carried out at a comparatively low temperature if it is desired to avoid the formation of bubbles in the product. If desired after an infusible product is obtained and previous to the final heat treatment the material may be worked or machined into desired forms.

The material at this stage is still colored but not so deeply as in the initial stages of the reaction. The material may now be heated at higher temperatures preferably at about 175° C. until it is substantially colorless. At this point the material will be found to possess its maximum water resistivity and further heating serves only for the production of a yellow color without serving to increase the water resistance.

Of course if larger amounts of dye were used the heating would need to be more prolonged to develop sufficient yellow to neutralize the dye. On the other hand, if substantially smaller amounts of dye were to be used, the product would not have attained its maximum water resistivity at the point when it becomes colorless. Therefore, I prefer to use the proportion of dye stated although it is obvious that small departures may be made therefrom.

It is further obvious that if a dye be developed which has all the properties of the one described or if a mixture of dyes were made which would possess the properties of the described dye that they would replace the one I have found to be suitable.

The above formula is given merely by way of example and is not intended to limit the invention in any respect, as the scope of the invention should be determined from the appended claims and an understanding of the illustrated embodiment with an appreciation of the advantages which the invention produces therein.

I claim:

1. The method of making substantially water white products which comprises heat treating a mixture of the following substances in substantially the proportions specified:—

200 grams of citric acid crystals
100 grams of glycerol
8 cubic centimeters of 0.1% solution of methyl violet 2 B in water, subsequently giving form to the viscous material produced thereby and finally heat treating the formed material until substantially water white.

2. In the production of a substantially water white resin from citric acid and a polyhydric alcohol, the step of adding methyl violet 2 B dye in sufficient quantity to complement the inherent color of the resin when the reaction has progressed to the desired point of completeness, whereby a substantially water white product results.

3. In the production of a substantially water white resin from citric acid and a polyhydric alcohol, the step of adding methyl violet 2 B dye in sufficient quantity to complement the inherent color of the resin when the reaction has progressed to the desired point of completeness, whereby to serve as a reaction indicator and to produce a substantially water white product.

OSCAR A. CHERRY.